United States Patent
Hanigk

(10) Patent No.: US 11,735,339 B2
(45) Date of Patent: Aug. 22, 2023

(54) CURRENT FEEDTHROUGH SEAL ASSEMBLY

(71) Applicant: National Instruments Germany GmbH, Munich (DE)

(72) Inventor: Michael Hanigk, Munich (DE)

(73) Assignee: National Instruments Germany GmbH, Munich (DE)

( * ) Notice: Subject to any disclaimer, the term of this patent is extended or adjusted under 35 U.S.C. 154(b) by 0 days.

(21) Appl. No.: 17/537,121

(22) Filed: Nov. 29, 2021

(65) Prior Publication Data

US 2022/0189663 A1   Jun. 16, 2022

(30) Foreign Application Priority Data

Dec. 16, 2020 (DE) .......................... 102020133710.8

(51) Int. Cl.
 *H01B 17/58* (2006.01)
 *H02G 3/22* (2006.01)

(52) U.S. Cl.
 CPC ............. *H01B 17/583* (2013.01); *H02G 3/22* (2013.01)

(58) Field of Classification Search
 CPC ....... H02G 3/22; H02G 15/013; H01B 17/583
 See application file for complete search history.

(56) References Cited

U.S. PATENT DOCUMENTS

| | | | | |
|---|---|---|---|---|
| 2,568,277 A | * | 9/1951 | Eltgroth | G01N 29/02 73/24.01 |
| 3,142,983 A | * | 8/1964 | Dudley | G01N 25/00 374/40 |
| 3,538,750 A | * | 11/1970 | Lynnworth | G01N 29/228 374/45 |
| 3,676,777 A | * | 7/1972 | Charters | G01R 31/31905 324/762.02 |
| 3,987,133 A | * | 10/1976 | Andra | F24F 6/025 261/130 |
| 4,826,276 A | * | 5/1989 | Abbott | G02B 6/4236 385/94 |
| 4,990,312 A | * | 2/1991 | Rucker | G01N 25/50 422/78 |

(Continued)

*Primary Examiner* — Timothy J Thompson
*Assistant Examiner* — Rhadames Alonzo Miller
(74) *Attorney, Agent, or Firm* — Kratz, Quintos & Hanson, LLP

(57) ABSTRACT

A current feedthrough seal assembly (1) for insertion into and sealing a wall opening (WO) of a climate chamber (KK) comprises a plastic core (10) formed in a step-like shape in an axial direction thereof so as to be inserted into the wall opening (WO) of the climate chamber (KK), so that, when inserted, substantially the whole of the plastic core (10) is located in the wall opening (WO), and a flange (11) is formed at an axial end of the plastic core (10) to protrude beyond the wall opening in the radial direction of the plastic core (10) to abut against one (I) of an internal or external wall (I, A) of the climate chamber (KK), at least two elongated power conducting members (20) accommodated in parallel to each other inside the plastic core (10) and extending through the plastic core (10) and a press ring seal (30) interposed between an inner peripheral surface of the wall opening (WO) and an outer peripheral surface of the plastic core (10) on an opposite axial side thereof with respect to the flange (11) of the plastic core (10).

22 Claims, 2 Drawing Sheets

(56) References Cited

U.S. PATENT DOCUMENTS

| | | | | |
|---|---|---|---|---|
| 5,220,824 | A * | 6/1993 | Shelleman | G01N 3/12 |
| | | | | 374/57 |
| 5,318,361 | A * | 6/1994 | Chase | G01N 17/002 |
| | | | | 374/57 |
| 5,466,943 | A * | 11/1995 | Green | H01L 31/024 |
| | | | | 250/493.1 |
| 5,806,979 | A * | 9/1998 | Gschneidner, Jr. et al. | |
| | | | | G01N 25/005 |
| | | | | 374/33 |
| 5,851,143 | A * | 12/1998 | Hamid | G01R 31/2849 |
| 5,929,340 | A * | 7/1999 | Cochran | G01R 31/2817 |
| | | | | 324/700 |
| 6,005,404 | A * | 12/1999 | Cochran | G01R 31/2817 |
| | | | | 324/754.08 |
| 8,479,597 | B2 * | 7/2013 | Pickel | G01M 7/027 |
| | | | | 73/571 |
| 9,097,609 | B1 * | 8/2015 | Kelley | G01M 3/32 |
| 9,678,025 | B1 * | 6/2017 | Fesmire | G01N 25/72 |
| 10,031,097 | B1 * | 7/2018 | Han | G01N 27/121 |
| 2008/0210455 | A1 * | 9/2008 | Pollack | H01R 13/405 |
| | | | | 174/151 |
| 2013/0201627 | A1 * | 8/2013 | Limbacher | H05K 7/20418 |
| | | | | 361/688 |
| 2016/0268791 | A1 * | 9/2016 | Gerl | C03C 8/24 |
| 2017/0141443 | A1 * | 5/2017 | Herklotz | H01M 10/482 |
| 2020/0245165 | A1 * | 7/2020 | Nilsson | G01R 29/105 |
| 2022/0349783 | A1 * | 11/2022 | Bender | B01L 1/025 |

* cited by examiner

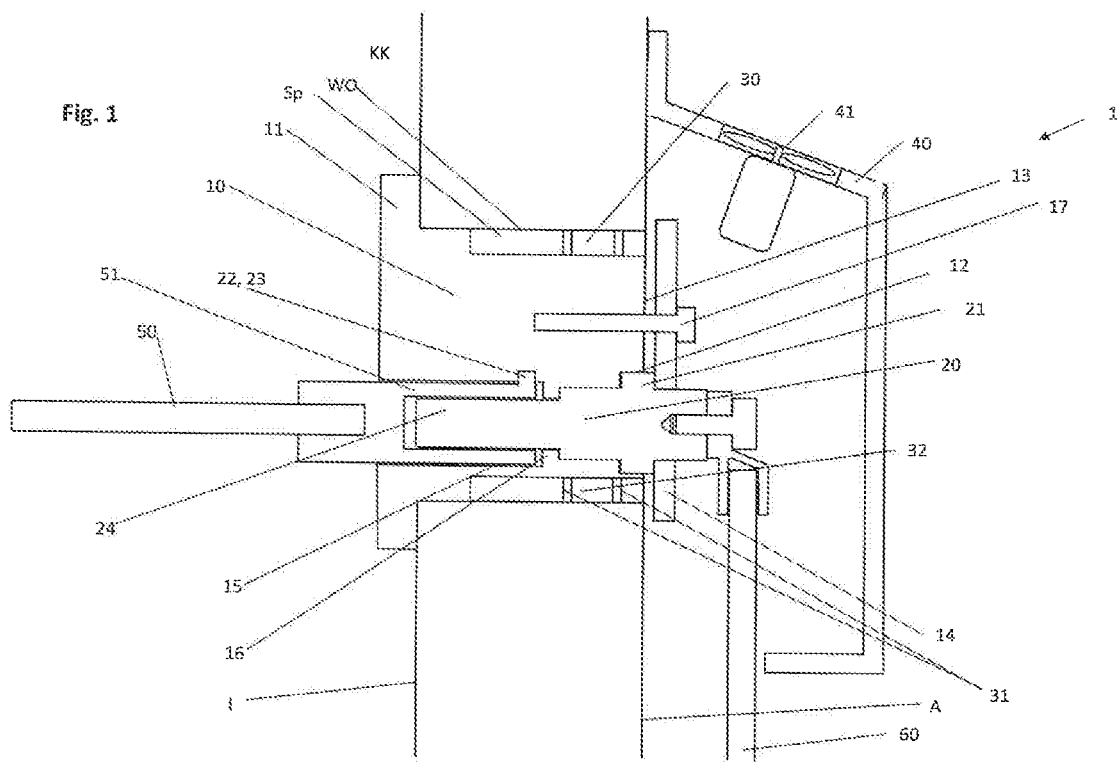

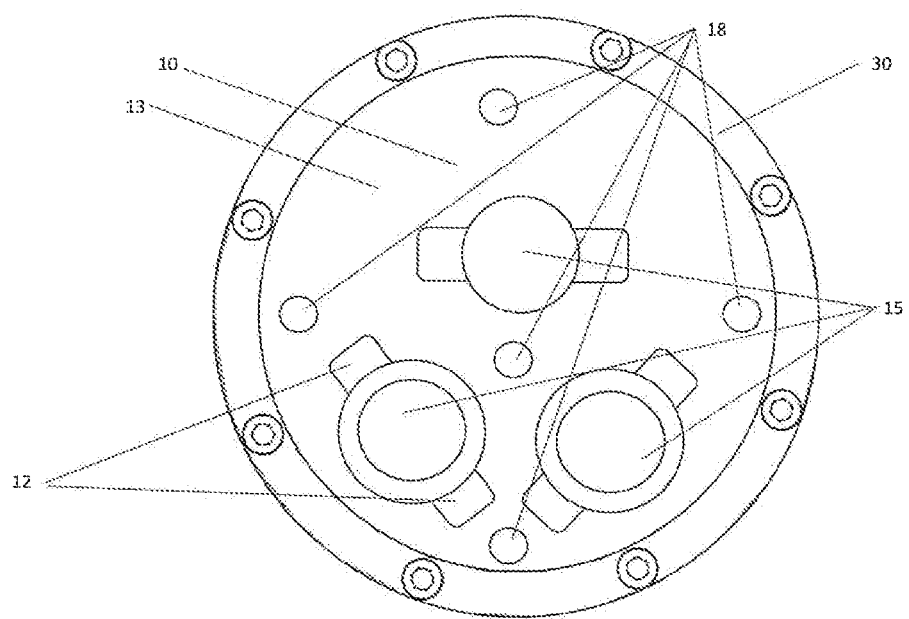

CURRENT FEEDTHROUGH SEAL ASSEMBLY

FIELD OF THE INVENTION

The present invention relates to a current feedthrough seal assembly for insertion into and sealing a wall opening of a climate chamber.

PRIOR ART

Climate chambers are commonly used to test different types of products in a temperature range corresponding to the extreme values of daily use of the products. Depending on which products are being tested, a climate chamber must have different supply and signal connections. For example, in case accumulators (battery cells, battery modules, battery packs) are to be tested in the climate chamber, it is also necessary that the accumulators or secondary batteries to be tested in the climate chamber are connected to a power supply. This is necessary in order to map or simulate a charge/discharge load in addition to the temperature load.

Depending on a size and embodiment of the accumulators, a power supply in the low voltage range (up to 1500 V) is required. This applies in particular if the accumulators or secondary batteries are used for electrically powered vehicles (for example BEV, PHEV). Usually, this requires a power supply into the climate chamber, which is designed for voltages up to 1500 V as well as current strengths up to 1000 A.

In addition to the electrical performance of such a current feedthrough, an appropriate current feedthrough seal assembly for a climate chamber requires that not only electrical insulation is provided, but also that necessary thermal insulation is maintained to allow efficient operation of the climate chamber. In order to minimize interference with the appropriate insulated conversions of the climate chamber, it is desirable for a current feedthrough seal assembly to be as small as possible. However, since the electrical leads of the assembly (electrodes) as such require several centimeters in diameter, and the adjacent components of the assembly must have equally appreciable dimensions for flashover protection, there is already a conflict of objectives at this point concerning the dimensions (especially the diameter) of the current feedthrough seal assembly.

In addition to the problem areas mentioned above, there is another requirement. Such a current feedthrough seal assembly must also ensure that, in the event of an accident, the entire climate chamber is gas-tight to prevent toxic gases or substances from escaping.

Current feedthrough seal assemblies must also meet certain cable routing and connection requirements. Since a large number of accumulators have to be tested one after the other in corresponding climate chamber tests and a large number of tests have to be carried out, as usually each secondary battery or battery pack has to be tested before being used in an electric vehicle, a larger number of climate chambers is necessary. In order to reduce their installation location in a space requirement, it is desirable that connecting leads or connecting cables be provided in a space-saving manner. Furthermore, in order to complete the charging of each climate chamber with a test object in the shortest possible time, it is desirable to have an easy-to-use connection of the test object in or at the climate chamber.

In the prior art, a use of multiple sealing inserts in a split hinged design is known so far. However, these split hinged multiple sealing inserts require the greatest attention in their design or their installation in the wall opening in order to ensure appropriate gas tightness. Accordingly, there is potential for improvement with respect to space requirement as well as user friendliness.

SUMMARY OF THE INVENTION

To address the foregoing multi-faceted problems, some of which harbor conflicting objectives, a current feedthrough seal assembly in accordance with the present invention is proposed.

The present disclosure provides a current feedthrough seal assembly for insertion into and sealing of a wall opening of a climate chamber, wherein the current feedthrough seal assembly comprises a plastic core formed in a step-like shape in an axial direction thereof to be inserted into the wall opening of the climate chamber so that, when inserted, substantially the whole of the plastic core is located in the wall opening and a flange of the plastic core is formed at an axial end of the plastic core to protrude in a radial direction of the plastic core beyond the wall opening to abut against one of an internal wall and an external wall of the climate chamber, at least two elongated power conducting members accommodated in parallel to each other inside the plastic core and extending through the plastic core, and a press ring seal interposed between an inner peripheral surface of the wall opening and an outer peripheral surface of the plastic core on an opposite axial side thereof with respect to the flange of the plastic core.

In the current feedthrough seal assembly according to the present invention, the at least two elongated power conducting members are received in the plastic core. In this regard, the at least two elongated power conducting members correspond to a positive power conducting member and a negative power conducting member. The power conducting members can be inserted into the plastic core with sufficient tolerances to achieve a corresponding tightness between the power conducting members and the plastic core. However, in contrast to the prior art, the current feedthrough seal assembly according to the present invention is capable of significantly reducing a sealing surface requirement by requiring the press ring seal to be provided only between an inner peripheral surface of the wall opening of the climate chamber and an outer peripheral surface of the plastic core. A sealing surface requirement of the press ring seal to each of the power conducting members is not required.

While in the prior art the power conducting members (insulated cable harnesses) were fixed and sealed directly with a split and/or hinged press ring seal, it was difficult to reconcile appropriate thermal and electrical insulation and gas tightness. With the current feedthrough seal assembly according to the present invention, it is possible to achieve electrical insulation, thermal insulation as well as gas tightness in equal measure. This effect is due to the fact that the power conducting members are directly recessed or inserted into the plastic core, and the press ring seal seals the wall opening and the outer peripheral surface of the plastic core. This allows the sealing area to be minimized.

In the preceding current feedthrough seal assembly, the press ring seal may be slidable on the outer peripheral surface of the plastic core in the axial direction of the plastic core before being axially compressed to be flush with the other of the internal wall or the external wall of the climate chamber.

The press ring seal is slidably provided on the outer peripheral surface of the plastic core. Now, if the outer peripheral surface of the plastic core as well as the inner peripheral surface of the wall opening of the climate chamber have constant cross sections, i.e., circular, elliptical, polygonal, or a combined shape thereof, it is possible that the current feedthrough seal assembly according to the present invention is suitable for different wall openings or climate chambers. In particular, this can equalize different wall thicknesses of the climate chamber, i.e., one and the same current feedthrough seal assembly can fit into wall openings of different thicknesses.

The press ring seal is now provided in the wall opening so that it is flush with the corresponding wall of the climate chamber. When the press ring seal is now axially compressed in this state to develop its sealing effect, forces are thereby exerted radially inward and radially outward with respect to an axis of the respective plastic core. The plastic core itself should be largely homogeneous in its force absorption capacity at a high level. However, the wall opening of the climate chamber is usually not homogeneous to the same high degree. An axially inner section of the wall opening is usually much more compliant in a force absorption capacity than the axial edge sections of the wall opening, which are in the vicinity of the climate chamber internal and external walls. Thus, applying force near a wall opening plane will result in much less deformation. For this reason, a press ring seal applied flush with the internal or external wall of the climate chamber is superior in terms of tightness.

In the preceding current feedthrough seal assembly, an annular temperature isolation gap may be formed between the press ring seal and the flange of the plastic core in the axial direction and between the inner peripheral surface of the wall opening and the outer peripheral surface of the plastic core in the radial direction.

When the plastic core has a flange on one side abutting one wall of the internal wall and the external wall of the climate chamber, and the press ring seal is provided on the opposite side with respect to a wall thickness of the climate chamber, an annular temperature isolation gap is formed between the outer peripheral surface of the plastic core and the inner peripheral surface of the wall opening. Depending on the cross-sections of the wall opening and the plastic core, a cylindrical temperature isolation gap is created. This temperature isolation gap allows to reduce heat transfer through the wall. A thermal efficiency is thus improved.

In the foregoing current feedthrough seal assembly, each elongated power conducting member may have at least one radial protrusion on the side of the plastic core on which the press ring seal is located, which protrusion is located in a corresponding recess on an associated end face of the plastic core. Each elongated power conducting member extending through the plastic core may have at least one radial protrusion located in a corresponding recess on the associated end face of the plastic core. This ensures that each elongated power conducting member can absorb both an axial tensile force through the plastic core and a rotational force about the power conducting member axis. This produces a beneficial effect, particularly with respect to the usability of the current feedthrough seal assembly. In particular, in this design, the insertion strength of the power conducting member does not depend on a sealing surface (pressing surface) of a hinged press ring seal, but is generated by a form fit that allows significantly larger axial forces and rotational forces to be absorbed.

In the preceding current feedthrough seal assembly, a plastic plate may be attached to the end face of the plastic core in such a way that the radial protrusions of the power conducting members are axially and/or radially fixed.

If the current feedthrough seal assembly now has elongated power conducting members which have radial protrusions located in corresponding recesses on the associated end face of the plastic core, a plastic plate can additionally be provided. The plastic plate is attached to the end face of the plastic core in such a way that it takes the radial protrusions of the power conducting members between it and the plastic core, so that not only can axial forces be absorbed in the direction toward the recess of the plastic core, but furthermore axial forces can also be absorbed in the direction toward the plastic plate. In other words, each power conducting member can thus absorb compressive forces and tensile forces in the axial direction.

To enable appropriate connection of the power conducting members with corresponding connecting cables, it is possible for each elongated power conducting member to extend outwardly through the plastic plate.

However, in addition to this possibility, it is alternatively also possible that the elongated power conducting members do not extend outwardly through the plastic plate, but that the plastic plate merely provides corresponding openings to reach the underlying elongated power conducting members with the connecting cables or eyelets or terminals. In such a case, for example, a cable connection eyelet of a connecting cable can be inserted into the corresponding openings in the plastic plate in order to contact the associated power conducting member between the plastic plate and the plastic core.

In the preceding current feedthrough seal assembly, the plastic plate may have a diameter larger than that of the press ring seal.

When the plastic plate has a diameter larger than that of the press ring seal, the plastic plate covers the wall opening. When the plastic plate covers the wall opening, it is possible, by tightening connecting bolts that tighten the plastic plate to the plastic core, that the plastic core on the side of the flange is brought into even closer contact with the opposite wall surface. By tightening the plastic plate to the plastic core, a surface pressure on the internal wall and external wall of the climate chamber is increased on both sides of the wall opening, further improving thermal insulation and gas tightness.

In the foregoing current feedthrough seal assembly, each elongated power conducting member on the side of the plastic core on which the flange is located may be of the plug-in or screw-in type for internal power conduction in the climate chamber. The cable connection can have one or more radial protrusions, each with an individual geometry, in order to realize a clear assignment of the plug-in cable connection.

The radial protrusions, each having an individual geometry, can ensure that corresponding lead cables or sockets are properly connected to corresponding power conducting members. Proper connection includes, first, connecting the cables to the corresponding power conducting members of the current feedthrough seal assembly according to their polarity. This can also ensure that sufficient positive engagement or contact is provided between corresponding sockets of connecting cables with the power conducting members. These radial protrusions can be part of a bayonet lock.

For a bayonet lock, it is also conceivable that not the power conducting members are provided with radial protrusions with individual geometry in each case, but the corresponding sockets which are inserted between the power conducting members and the plastic core in order to establish an areal contact with at least the power conducting members. Depending on whether the sockets have the radial protrusions (bayonet lock) on their inner peripheral side or outer peripheral side, the power conducting members (on the inner peripheral side of the sockets) or the plastic core (on the outer peripheral side of the sockets) accordingly have matching grooves to accommodate the radial protrusions.

If the axial ends of the power conducting members remain below the surfaces of the end faces of the plastic core or plastic plate, respectively, the current feedthrough seal assembly can be designed more compact.

In the preceding current feedthrough seal assembly, the press ring seal may have a constant radial dimension beyond its circumference.

The constant radial dimension of the press ring seal creates constant or uniform sealing forces. Uniform sealing forces ensure that a high contact pressure can be applied over a large area near a limit of the structure of the wall opening or wall opening material without exceeding this limit. This results in better gas tightness as well as better fixation of the current feedthrough seal assembly within the wall opening.

In the preceding current feedthrough seal assembly, the press ring seal may have two rigid ring members with an elastic sealing material between them in the axial direction of the plastic core, which deforms inward and outward in the radial direction when the ring members are contracted.

The press ring seal with two rigid ring members, between which there is an elastic sealing material, is an annular space seal of closed design. Here, too, the closed design ensures that the sealing force application is very uniform and homogeneous. As a result, higher sealing forces can be achieved overall.

In the preceding current feedthrough seal assembly, the elastic sealing material can be formed without interruption in the circumferential direction.

By making the elastic sealing material interruption-free in the circumferential direction, the areas to be sealed are reduced to an absolute minimum. Compared with hinged seals, interruption-free, closed seals do not have those additional sealing surfaces within the seal where individual seal parts abut against each other in the collapsed state.

In the foregoing current feedthrough seal assembly, the power conducting members may be disposed in through holes formed in the plastic core, and stoppers may be provided in the through holes protruding radially inwardly from the peripheral walls of the through holes against which the power conducting members abut in the axial direction.

The power conducting members are formed in the through holes in the plastic core, and there are stoppers in these through holes that protrude radially inward from the inner circumferences of the through holes. These protrusions may comprise only a portion of the inner circumference or may comprise the entire inner circumference. In the event that the protrusions comprise only a portion of the circumference, they can accommodate corresponding axial forces applied to the power conducting members while reducing only a small portion of the cross-section of the power conducting member. In the event that the radial protrusions comprise the entire circumference, a conductive cross-section of the respective power conducting member is reduced to a greater extent, but it is thus possible to apply an additional sealing material to the corresponding contact surfaces between the radial protrusion (radial circumferential collar) and the corresponding positioning surfaces of the power conducting members. Thus, the gas tightness of the entire current feedthrough seal assembly can be increased.

In the preceding current feedthrough seal assembly, the plastic core on the side of the press ring seal may be provided with a cover provided with a fan above the outwardly protruding axial ends of the power conducting members.

A cover for the current feedthrough seal assembly or plastic core may be provided on an outside of the climate chamber. This cover may be provided with a ventilation unit or fan. Inside the climate chamber, a temperature difference of −40° to 180° is usually simulated for testing purposes. In the case that the climate chamber has a lower threshold of about −40° inside and the climate chamber is set up in an ambient temperature of about 20°, a temperature difference of about 60° will cause the metallic parts exposed to the outside to accumulate condensation, since the power conducting members serve as a thermal bridge. To remove this unwanted condensation, an airflow is generated under the cover that can remove the condensation. In addition, when the climate chamber is operating at a positive temperature, the air flow can prevent or reduce excessive heating of the connecting leads.

In the foregoing current feedthrough seal assembly, the current feedthrough seal assembly may be suitable for the feedthrough of currents up to 1000 A current strength and up to 1500 V voltage.

The current feedthrough seal assembly explained above is suitable for the feedthrough of currents up to 1000 A and up to 1500 V (low voltage limit). In particular, the current feedthrough seal assembly is suitable for the feedthrough of currents from 50 A to 1000 A current strength and/or 3V to 1500V voltage. In order to be able to conduct these high currents, it is necessary at least for the power conducting members of the current feedthrough seal assembly to have a sufficiently large cross-section. This requires a diameter of the power conducting members of 12 mm to 50 mm.

The material of the plastic core and/or plastic plate may be polyethylene PE or polypropylene PP or polyamide PA, that is, a high-temperature plastic with continuous service temperatures above 140° C.

BRIEF SUMMARY OF THE DRAWINGS

FIG. 1 shows a cross-sectional view of a current feedthrough seal assembly according to the invention.

FIG. 2 shows a frontal view of the plastic core and press ring seal from the press ring seal side without cover.

DETAILED DESCRIPTION OF THE PREFERRED EMBODIMENT

FIG. 1 shows a sectional view of the current feedthrough seal assembly according to the present invention. A climate chamber KK has an isolating wall in which a wall opening WO is provided. In the present case, this wall opening is circular cylindrical. A circular cylindrical wall opening and the associated circular cross-sectional shape of the current feedthrough seal assembly enable an optimum provision of a sealing effect.

A plastic core 10 is provided in a step-like manner, so that a flange 11 can be provided on the inside of the climate chamber KK in such a way that it protrudes beyond the wall opening. That is, the flange 11 has a larger outer diameter than that of the wall opening. This can ensure better sealing at the axial contact surface of the flange 11 with the inner wall surface. The subsequent step in the cross-section of the plastic core is intended to ensure a correspondingly accurate fit in the wall opening. Relatively shortly behind the inner wall surface of the climate chamber, a further reduction in cross-section takes place from this step. This reduction in cross-section creates a gap which is sufficiently large to allow insertion of a press ring seal 30. Accordingly, the plastic core 10 of the present embodiment has three sections with different diameters.

The press ring seal 30 is shown in this embodiment to be non-flush with the outer wall surface of the climate chamber. As can be seen from the constant inner diameter of the wall opening WO as well as the constant cross-sectional portion of the plastic core 10, the press ring seal is axially slidable in the gap provided for this purpose between the wall opening WO and the plastic core 10. That is, the plastic core or current feedthrough seal assembly shown here is also suitable for use in climate chambers having different walls.

The press ring seal 30 is activated by compressing the elastic sealing material 32 via the two rigid ring members 31 to form two sealing surfaces. A first sealing surface is located between the press ring seal 30 and the wall opening WO, and a second sealing surface is located between the press ring seal 30 and the outer peripheral surface of the plastic core 10.

Since in the present case an annular circular cylindrical press ring seal 30 is used, which has a constant radial dimension, an optimum sealing effect is achieved here.

Elongated power conducting members 20 are inserted into the plastic core 10 from the outside of the current feedthrough seal assembly. The power conducting members have different cross-sections and, in the present embodiment, the corresponding intermediate step surface abuts a stopper 16 formed in the plastic core 10. At this point, it can be achieved that a corresponding pressing effect is generated between the power conducting member 20 and the plastic core 10 in the axial direction at the circumferential continuous step surface to further increase a sealing effect between the power conducting member 20 and the plastic core 10. This may be advantageous in the case where a corresponding fit of the power conducting member 20 in the plastic core 10 is subject to an increased tolerance generated due to the wide temperature range. This increased temperature difference may result from very high currents being conducted through the power conducting member. This stepped cross-section of the power conducting member, as well as an associated stopper 16 or collar, is not mandatory.

Furthermore, the present embodiment is configured such that each power conducting member 20 has two radial protrusions 21. These radial protrusions are intended to be located positively in corresponding recesses 12 in the plastic core 10. This ensures that corresponding tensile forces on the power conducting members 20 in the direction towards an interior I of the climate chamber KK can be absorbed. In addition, the corresponding radial protrusions 21 and the associated recesses 12 can also absorb rotational forces which are applied to each power conducting member 20 by an actuation (e.g. connection of connecting cables). Even if one radial protrusion 21 per power conducting member is sufficient for this purpose, the provision of two radial protrusions 21 and two associated recesses 12 is desirable for reasons of symmetrical force distribution.

With regard to axial forces, the radial protrusions 21 of the power conducting members in conjunction with the recesses 12 of the plastic core are only capable of absorbing axial forces of the power conducting members in the direction toward the plastic core (also rotational forces due to the form fit). In addition, to absorb axial forces of the power conducting members away from the plastic core 10, a plastic plate 14 is provided in the present embodiment to prevent removal of the power conducting members 20 from the plastic core 10. In the present embodiment, the plastic plate 14 is shown without corresponding recesses. The plastic plate 14 may also have corresponding recesses for the radial protrusions 21 (not shown). The plastic plate 14 is fixed to the plastic core 10 by means of screws 17. In the present embodiment, the plastic plate 14 is not in direct contact with the plastic core 10, but only with the radial protrusions 21 of the power conducting members 20. This ensures that the entire screw force applied to the plastic plate 14 is transmitted to the radial protrusions 21. This maximization of the force input to the radial protrusions 21 of the power conducting members 20 is particularly advantageous when, for example, corresponding sockets 51 are to be brought into close contact with the reduced diameter area 24 of the power conducting members 20 from the inside of the climate chamber.

When the connecting cables 50 are to be connected to the power conducting members 20 by means of the sockets 51, in the present embodiment each socket 51 has one or more radial protrusions 22, 23 each having an individual geometry. The radial protrusions 22, 23 may also be provided on the power conducting members 20. Overall, this is to realize a distinctive bayonet lock for each power conducting member 20. This ensures that the correct connecting cable is connected to the corresponding pole and that a reliable and always consistent contact is established.

On the opposite side, i.e. the outside of the climate chamber, the corresponding end of the power conducting member 20 protrudes bluntly over the plastic plate 14. A screw hole is provided in the power conducting member 20 at this end. The screw hole (no corresponding reference sign) receives a corresponding screw that connects a connecting eyelet of a connecting cable 60 to the power conducting member 20. The eyelet of the connecting cable 60 allows the connecting cable 60 having an appreciable diameter to be directed straight and vertically along the external wall of the climate chamber KK toward the floor. This realizes a space-saving arrangement that would not be possible with corresponding cable passages, since the bending radii of correspondingly thick connecting cables are relatively large.

The overall combination of connecting cables 50, 60 and the power conducting member 20 in between forms a heat/cold bridge between the inside I and the outside A of the climate chamber KK. If a comparatively low temperature now prevails on the inside I of the climate chamber KK, the temperature gradient with respect to the ambient temperature outside the climate chamber KK is comparatively large. As a result, condensation forms on the metallic portion exposed to the outside A of the climate chamber KK, i.e., the blunt end of the power conducting members 20, the screw as well as the connecting eyelet of the connecting cable 60. Now, in order to prevent or remove this condensation, a corresponding cover 40 is provided around the current feedthrough seal assembly, which provides a fan unit 41 consisting of an electric motor and a fan at an upper end of the cover 40. The fan unit (fan) 41 generates an air flow from top to bottom through the enclosed space of the cover, which absorbs the corresponding moisture (condensation) and removes it downwardly. In this way, a wide variety of problems associated with condensation can be avoided. In addition, in the case of positive temperature operation of the climate chamber, excessive heating of the connecting leads can be counteracted by means of the air flow.

With regard to the inside I and the outside A of the climate chamber KK as shown in FIG. 1, it should be noted that these can also be reversed with the same design of the current feedthrough seal assembly. In this case, the current feedthrough seal assembly would not be inserted from the inside to the outside, but from the outside to the inside.

FIG. 2 shows only the plastic core 10 and the associated press ring seal 30. The press ring seal 30 has a number of screws that are used to bring the rigid ring members 31 closer together, thereby squeezing the elastic sealing material 32 between them. The radial expansion of the elastic sealing material 32 causes the corresponding minimum distances between the press ring seal and the plastic core 10, and between the press ring seal 30 and the inner peripheral surface of the wall opening WO, to be reduced and come into contact in such a way that a correspondingly necessary sealing effect is achieved.

It can also be seen in FIG. 2 that through holes 15 are provided for three power conducting members 20. Each through hole is provided with two recesses 12, which can be of any shape, that face each other here. While axial force absorption is also possible with one recess 12 per power conducting member 20, a number of two or more recesses 12 per power conducting member 20 enables a more even and symmetrical distribution. Furthermore, with multiple recesses 12 per power conducting member 20, their longitudinal or radial extensions can be reduced. This enables an even more compact design of the plastic core and thus of the current feedthrough seal assembly.

Between the corresponding through holes 15 are further screw holes 18, which are used to fix the plastic plate 14.

While in each of the two lower and also larger through holes 15 a stopper 16 complete in the circumferential direction is shown, the upper through hole 15 functions without such a stopper 16 in the present embodiment. As described above, however, all through holes 15 can also be provided with stoppers or without stoppers, depending on the requirements for tightness and usability.

The invention claimed is:

1. A current feedthrough seal assembly for insertion into and sealing a wall opening of a climate chamber, wherein the current feedthrough seal assembly comprises:
 a plastic core formed in a step-like shape in an axial direction thereof to be inserted into the wall opening of the climate chamber so that, when inserted, substantially the whole of the plastic core is located in the wall opening, and a flange of the plastic core is formed at an axial end of the plastic core to protrude in a radial direction of the plastic core beyond the wall opening to abut against one of an internal or external wall of the climate chamber,
 at least two elongated power conducting members accommodated in parallel to each other inside the plastic core and extending through the plastic core, and
 a press ring seal interposed between an inner peripheral surface of the wall opening and an outer peripheral surface of the plastic core on an opposite axial side thereof with respect to the flange of the plastic core.

2. The current feedthrough seal assembly according to claim 1, wherein
 the press ring seal is slidable on the outer peripheral surface of the plastic core in the axial direction of the plastic core before being axially compressed to be flush with the other of the internal or external wall of the climate chamber.

3. The current feedthrough seal assembly according to claim 1, wherein
 an annular temperature isolation gap is formed between the press ring seal and the flange of the plastic core in the axial direction and between the inner peripheral surface of the wall opening and the outer peripheral surface of the plastic core in the radial direction.

4. The current feedthrough seal assembly according to claim 2, wherein
 an annular temperature isolation gap is formed between the press ring seal and the flange of the plastic core in the axial direction and between the inner peripheral surface of the wall opening and the outer peripheral surface of the plastic core in the radial direction.

5. The current feedthrough seal assembly according to claim 1, wherein
 each elongated power conducting member has, on the side of the plastic core on which the press ring seal is located, at least one radial protrusion located in a corresponding recess on an associated end face of the plastic core.

6. The current feedthrough seal assembly according to claim 5, wherein
 a plastic plate is fixed to the end face of the plastic core in such a way that the radial protrusions of the power conducting members are axially and/or radially fixed.

7. The current feedthrough seal assembly according to claim 3, wherein
 each elongated power conducting member has, on the side of the plastic core on which the press ring seal is located, at least one radial protrusion located in a corresponding recess on an associated end face of the plastic core, and
 a plastic plate is fixed to the end face of the plastic core in such a way that the radial protrusions of the power conducting members are axially and/or radially fixed.

8. The current feedthrough seal assembly according to claim 6, wherein
 each elongated power conducting member protrudes outwardly through the plastic plate.

9. The current feedthrough seal assembly according to claim 6, wherein
 each corresponding axial end of the elongated power conducting member is located between the plastic core and the plastic plate.

10. The current feedthrough seal assembly according to claim 6, wherein
 the plastic plate has a diameter greater than that of the press ring seal.

11. The current feedthrough seal assembly according to claim 1, wherein
 each elongated power conducting member has, on the side of the plastic core on which the flange is located, one or more radial protrusions each having an individual geometry.

12. The current feedthrough seal assembly according to claim 1, wherein
 the press ring seal has a constant radial dimension around its circumference.

13. The current feedthrough seal assembly according to claim 2, wherein
 the press ring seal has a constant radial dimension around its circumference.

14. The current feedthrough seal assembly according to claim 1, wherein
 the press ring seal comprises two rigid ring members between which, in the axial direction of the plastic core, there is an elastic sealing material which deforms inwardly and outwardly in the radial direction when the ring members are contracted.

15. The current feedthrough seal assembly according to claim 13, wherein the press ring seal comprises two rigid ring members between which, in the axial direction of the plastic core, there is an elastic sealing material which deforms inwardly and outwardly in the radial direction when the ring members are contracted.

16. The current feedthrough seal assembly according to claim 14, wherein
the elastic sealing material is formed without interruption in the circumferential direction.

17. The current feedthrough seal assembly according to claim 15, wherein
the elastic sealing material is formed without interruption in the circumferential direction.

18. The current feedthrough seal assembly according to claim 1, wherein
the power conducting members are disposed in through holes formed in the plastic core, and
stoppers are provided in the through holes, protruding radially inward from the peripheral walls of the through holes, against which the power conducting members abut in the axial direction.

19. The current feedthrough seal assembly according to claim 17, wherein
the power conducting members are disposed in through holes formed in the plastic core, and
stoppers are provided in the through holes, protruding radially inward from the peripheral walls of the through holes, against which the power conducting members abut in the axial direction.

20. The current feedthrough seal assembly according to claim 1, wherein
the plastic core is provided with a cover on the side of the press ring seal, the cover being provided with a fan above the outwardly protruding axial ends of the power conducting members.

21. The current feedthrough seal assembly according to claim 1, wherein
the current feedthrough seal assembly is suitable for the feedthrough of currents up to 1000 A current strength and up to 1500 V voltage.

22. The current feedthrough seal assembly according to claim 3, wherein
the current feedthrough seal assembly is suitable for the feedthrough of currents up to 1000 A current strength and up to 1500 V voltage.

\* \* \* \* \*